(12) United States Patent
Zhang et al.

(10) Patent No.: US 11,550,097 B2
(45) Date of Patent: *Jan. 10, 2023

(54) ARRAY-TYPE POLARIZATION-MAINTAINING MULTI-CORE FIBER

(71) Applicant: YANGTZE OPTICAL FIBRE AND CABLE JOINT STOCK LIMITED COMPANY, Hubei (CN)

(72) Inventors: Xinben Zhang, Hubei (CN); Ming Tang, Hubei (CN); Chen Yang, Hubei (CN); Yue Meng, Hubei (CN); Kun Yang, Hubei (CN); Shen Peng, Hubei (CN); Chi Zhang, Hubei (CN); Beibei Cao, Hubei (CN); Weijun Tong, Hubei (CN)

(73) Assignee: YANGTZE OPTICAL FIBRE AND CABLE JOINT STOCK LIMITED COMPANY, Hubei (CN)

( * ) Notice: Subject to any disclaimer, the term of this patent is extended or adjusted under 35 U.S.C. 154(b) by 57 days.

This patent is subject to a terminal disclaimer.

(21) Appl. No.: 16/905,056

(22) Filed: Jun. 18, 2020

(65) Prior Publication Data

US 2020/0400877 A1 Dec. 24, 2020

(30) Foreign Application Priority Data

Jun. 20, 2019 (CN) .......................... 201910539234.6

(51) Int. Cl.
G02B 6/02 (2006.01)
G02B 6/024 (2006.01)
G02B 6/036 (2006.01)

(52) U.S. Cl.
CPC ......... *G02B 6/02042* (2013.01); *G02B 6/024* (2013.01); *G02B 6/03622* (2013.01); *G02B 6/03694* (2013.01)

(58) Field of Classification Search
CPC ........................ G02B 6/02042; G02B 6/03694
See application file for complete search history.

(56) References Cited

U.S. PATENT DOCUMENTS 5,949,941 A * 9/1999 DiGiovanni ........... G02B 6/105
385/127
10,018,796 B1 * 7/2018 Cook ...................... G02B 6/443
(Continued)

FOREIGN PATENT DOCUMENTS

CN 103399374 A 11/2013
WO WO-9419714 A1 * 9/1994 ....... C03B 37/01217

*Primary Examiner* — Eric Wong
(74) *Attorney, Agent, or Firm* — Tim Tingkang Xia, Esq.; Locke Lord LLP

(57) ABSTRACT

An array-type polarization-maintaining multi-core fiber includes a main outer cladding, fiber core units, and stress units. The fiber core units and the stress units are arranged to form a unit array including one central unit and any unit in the unit array being equidistantly arranged from adjacent units thereof. Provided is at least one pair of stress units, each pair of stress units being arranged symmetrical about one fiber core unit to form a polarization-maintaining fiber core unit. The fiber core units each include a fiber core and an inner cladding surrounding a core layer. A portion outside the fiber core units and the stress units is the main outer cladding. The fiber can greatly enhance spectral efficiency of an optical transmission system, and improve fiber communication capacity.

9 Claims, 2 Drawing Sheets

(56) References Cited

U.S. PATENT DOCUMENTS

| | | | |
|---|---|---|---|
| 2007/0269175 A1* | 11/2007 | Chen | G02B 6/02366 385/124 |
| 2012/0219255 A1* | 8/2012 | Bradley | G02B 6/3885 385/78 |
| 2015/0307387 A1* | 10/2015 | Fagan | C03B 37/01231 65/412 |
| 2016/0209583 A1* | 7/2016 | Hayashi | G02B 6/02042 |
| 2016/0245989 A1* | 8/2016 | Suzuki | G02B 6/02319 |
| 2017/0219774 A1* | 8/2017 | Kopp | G02B 5/3016 |
| 2017/0276867 A1* | 9/2017 | Kopp | G02B 6/02042 |

* cited by examiner

ARRAY-TYPE POLARIZATION-MAINTAINING MULTI-CORE FIBER

CROSS-REFERENCE TO RELATED APPLICATION

This application claims priority to and benefit of Chinese Patent Application No. 201910539234.6, filed Jun. 20, 2020 in the State Intellectual Property Office of P.R. China, which is hereby incorporated by reference in its entirety.

FIELD OF THE INVENTION

The present disclosure relates generally to the field of optical communication, and more particularly to an array-type polarization-maintaining multi-core fiber.

BACKGROUND OF THE INVENTION

With the rise and popularization of large data volume services such as cloud computing, Internet of Things, high-definition televisions, virtual reality and the like, requirements for the transmission capability of fiber communication networks become increasingly higher. By using super-channel multiplexing technologies, the capacity of a single fiber can be increased to above 100 Tb/s, which is close to the Shannon theorem limit of a single fiber. There is thus an urgent need for in-depth researching and developing of ultra-large-capacity fiber communication technologies of high spectral efficiency so as to address the problem of further expanding fiber communication networks. Space division multiplexing (SDM) technologies provide a plurality of independent physical channels for parallel data transmission by using multi-core fibers (MCFs) or few-mode fibers (FMFs) or even multi-core/few-mode combined new type fibers, and can, in conjunction with self-coherent detection, greatly enhance the spectral efficiency of optical transmission systems, improve fiber communication capacity, and reduce cost. SDM technology is therefore considered to be an effective approach to address capacity crisis of single-mode fibers. Compared with larger inter-mode dispersion or inter-mode crosstalk present in few-mode fibers, inter-core crosstalk in multi-core fibers is easier to control. Multi-core fibers are therefore more advantageous in interconnection density, capacity expansibility, and transmission distance. A multi-core fiber based homologous homodyne self-coherent optical communication system can fully exert the advantage of high spectral efficiency of coherent optical communication, and meanwhile simplify DSP process to significantly reduce power consumption. The multi-core fiber based homologous homodyne self-coherent optical communication system is hence a competitive solution for realizing data center interconnection at a rate of 800 Gbps and above across a single wave in a short distance.

In multi-core fiber based self-coherent detection, a fiber typically does not have a polarization-maintaining function (for example, patent CN103399374A), and in practical use, evolution of a polarization state of the fiber is random, which requires additional use of an automatic polarization controller to track the polarization state of local light so as to control polarization of the local light transmitted to a receiving end. This increases power consumption and complexity of the system, and increases processing latency.

SUMMARY OF THE INVENTION

A technical problem to be solved by the present disclosure is directed against the above described deficiencies in the existing technologies, and the present disclosure aims to provide an array-type polarization-maintaining multi-core fiber which can effectively enhance certainty of a polarization state of local light, improve reliability of a system, decrease photoelectric devices on a receiving end, reduce complexity of DSP, to thereby decrease cost of the system.

In order to solve the above technical problem, the present disclosure in one aspect discloses an array-type polarization-maintaining multi-core fiber including a main outer cladding and fiber core units, and further includes stress units. The fiber core units and the stress units are arranged to form a unit array, the unit array including one central unit and any unit in the unit array being equidistantly arranged from adjacent units thereof. Provided is at least one pair of (two) stress units, each pair of stress units being arranged symmetrical about one fiber core unit to form a polarization-maintaining fiber core unit. The fiber core units each include a fiber core and an inner cladding surrounding a core layer. A portion outside the fiber core units and the stress units is the main outer cladding.

In certain embodiments, the central unit is a fiber core unit, and stress units are symmetrically arranged on adjacent two sides of the fiber core unit as the central unit to form a central polarization-maintaining fiber core unit.

In certain embodiments, a distance between the adjacent units is 20-60 µm.

In certain embodiments, the unit array includes seven units, and is a regular hexagonal single-layer unit array including one fiber core unit located at a center and a pair of stress units symmetrical about the center, rest units being fiber core units.

In certain embodiments, the array unit includes nineteen units, and is a regular hexagonal double-layer unit array including one fiber core unit located at a center and a pair of stress units symmetrical about the center, rest units being fiber core units.

In certain embodiments, the stress units each have a cross-section of a round shape, a diameter of 5-45 µm, and a molar concentration of a doped element of 5%-30%.

In certain embodiments, the fiber core has a step refractive index and a diameter of 5-15 µm, and a relative refractive index difference between the fiber core and the main outer cladding is 0.15%-0.45%.

In certain embodiments, the fiber core has a graded refractive index which is represented as $n(r)=n_0 \cdot [1-2\Delta(r/a)^m]^{0.5}$, $0 \leq r \leq a$, wherein a radius a of the fiber core is 2.5-25 µm; a relative refractive index difference $\Delta$ between a geometric center of the fiber core and the main outer cladding is 0.20%-1.50%; a characteristic parameter m is 1.5-2.5; r is a distance from any point on the fiber core to the geometric center; and $n_0$ is a refractive index at the geometric center of the fiber core.

In certain embodiments, a relative refractive index difference between the inner cladding and the main outer cladding is −0.5%-0.05%; the inner cladding has a unilateral thickness of 1-10 µm; and the main outer cladding is a pure silica glass layer.

In certain embodiments, the fiber core and the inner cladding are provided therebetween with a transitional inner cladding. A ratio of a diameter of the transitional inner cladding to a diameter of the fiber core is 1.0-3.0. The transitional inner cladding is a pure silica glass layer.

In certain embodiments, polarization crosstalk at an operating wavelength of the polarization-maintaining fiber core within 1000 m is not lager than −10 dB.

In certain embodiments, the main outer cladding is provided therein with a reference line extending along a length direction of the fiber. A fiber core portion of the multi-core fiber is arranged asymmetrically relative to the reference line.

The present disclosure brings the following beneficial effects. 1. The multi-core fiber provides a plurality of independent physical channels for parallel data transmission, and can, in conjunction with self-coherent detection, greatly enhance the spectral efficiency of an optical transmission system, improve fiber communication capacity, and reduce cost. 2. The arrangement of the polarization-maintaining fiber core provides a waveguide structure with a function of maintaining polarized light, which can be used for transmission of local light. On the occasion of high capacity access networks or data center interconnection using self-coherent detection, the present disclosure can enhance certainty of polarization of local light, save automatic polarization controllers, reduce complexity of photoelectric devices and DSP on a receiving end, significantly decrease system latency, and thus reduce cost. 3. Providing the polarization-maintaining fiber core at the center of the fiber can reduce external interference and facilitate connecting. 4. Providing the inner cladding around the fiber core is helpful in reducing signal crosstalk among fiber cores and macrobend loss. In particular, the inner cladding of the polarization-maintaining fiber core can also improve stability of the amount of polarization crosstalk and anti-interference capability.

DETAILED DESCRIPTION OF THE EMBODIMENTS

Figure 1:
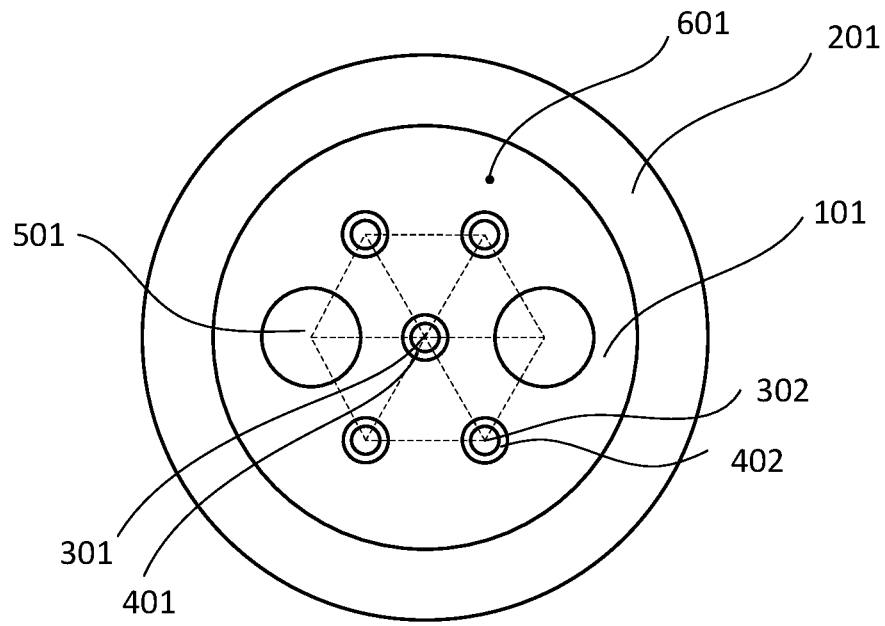
FIG. 1 is a cross-sectional structural view of a first embodiment of the present disclosure.

The present disclosure is further described in detail below in conjunction with embodiments. A first embodiment is as shown in FIG. 1. An array-type polarization-maintaining multi-core fiber includes a main outer cladding 101 and fiber core units, and further includes stress units. The fiber core units and the stress units are arranged to form a unit array. The unit array includes seven units, and is a regular hexagonal single-layer unit array including a fiber core unit located at a center and a pair of stress units 501 symmetrical about the center. Any unit in the unit array is equidistantly arranged from adjacent units thereof. A pair of stress units is arranged symmetrical about a central fiber core unit. Connecting lines among the pair of stress units and the central fiber core unit are straight lines. The pair of stress units and the central fiber core unit form a polarization-maintaining fiber core unit. The polarization-maintaining fiber core unit includes a polarization-maintaining fiber core 301 and a polarization-maintaining inner cladding 401. The stress units each have a cross-section of a round shape, and the stress units are boron-doped stress units. The boron-doped stress units each have a diameter of 35 µm. A core distance between each of the boron-doped stress units and the polarization-maintaining fiber core is 36 µm. A boron-doped stress area has a molar concentration of doped boron of 25%. A doped element may also be one or more selected from boron, germanium, and titanium. Polarization crosstalk at the polarization-maintaining fiber core is −15 dB within 1000 m. The fiber core units each include a fiber core 302 and an inner cladding 402 surrounding a core layer. A portion outside the fiber core units and the stress units is the main outer cladding. The fiber core has a step refractive index, and has a diameter of 9 µm. A relative refractive index difference between the fiber core and the main outer cladding is 0.40%. A relative refractive index difference between the inner cladding and the main outer cladding is −0.05%. The inner cladding has a diameter of 15 µm. The main outer cladding is a pure silica glass layer, and has a diameter of 150 µm. The polarization-maintaining fiber core and the polarization-maintaining inner cladding have structures the same as the structure of the core claddings of the above described fiber core units. The main outer cladding contains a reference line 601 extending along a length direction of the fiber. The reference line has a diameter of 1 µm. The reference line is located outside the unit array and at an asymmetric portion. The main outer cladding is coated with a coating layer 201 of resin. The resin is acrylic resin, and the coating layer has a diameter of 245 µm.

Figure 2:
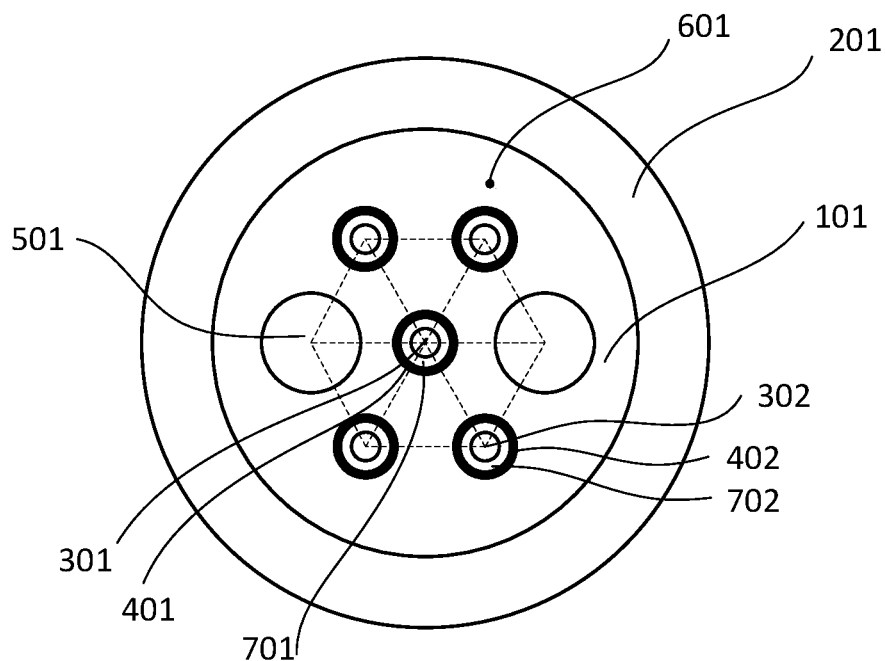
FIG. 2 is a cross-sectional structural view of a second embodiment of the present disclosure.

A second embodiment is as shown in FIG. 2. The second embodiment is different from the first embodiment in that the fiber core and the inner cladding are provided therebetween with a transitional inner cladding 702 having a diameter of 16 µm. The transitional inner cladding is a pure silica glass layer. The inner cladding has a diameter of 24 µm. Besides, the polarization-maintaining fiber core 301 and the polarization-maintaining inner cladding 401 are provided therebetween with a polarization-maintaining transitional inner cladding 701. The polarization-maintaining inner cladding and the polarization-maintaining transitional inner cladding have structures the same as those of the above described inner cladding and transitional inner cladding. Other structures in this embodiment are the same as those described in the first embodiment.

Figure 3:
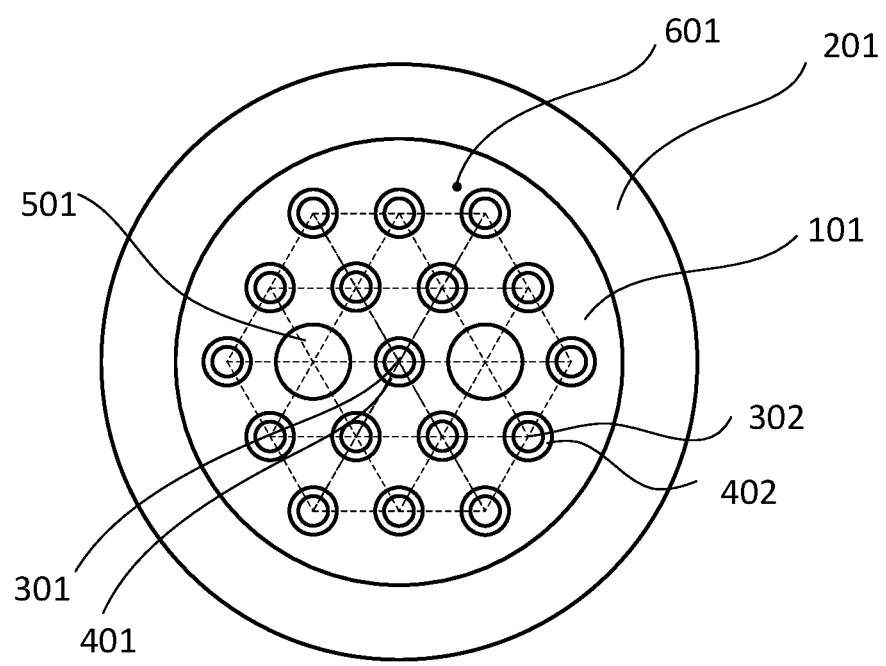
FIG. 3 is a cross-sectional structural view of a third embodiment of the present disclosure.

A third embodiment is as shown in FIG. 3. The third embodiment is different from the first embodiment in the following. The unit array has nineteen units, and is a regular hexagonal double-layer unit array, with twelve fiber units being increased and arranged in a second unit array layer. The stress units are boron-doped stress units. The boron-doped stress units each have a diameter of 25 µm. A core distance between each of the boron-doped stress units and the polarization-maintaining fiber core is 28 µm. The boron-doped stress area has a molar concentration of doped boron of 20%. The polarization crosstalk at the polarization-maintaining fiber core is −20 dB within 1000 m. The fiber core units each include a fiber core 302 and an inner cladding 402 surrounding a core layer. The inner cladding has a diameter of 15 µm. The core cladding of the polarization-maintaining fiber core unit has a structure the same as that of the core claddings of the fiber core units. The coating layer 201 is a polyimide coating layer. A long-time tolerable temperature of the fiber is 150° C. Other structures are the same as those described in the first embodiment.

The coating layer in the present disclosure may be made of: acrylic resin, polyimide, silicone rubber, nylon, graphene, and combinations thereof.

Accordingly, the fiber can greatly enhance spectral efficiency of an optical transmission system, and improve fiber communication capacity. The arrangement of the polarization-maintaining fiber core provides a waveguide structure with a function of maintaining polarized light, which can effectively improve certainty of polarization of local light, save automatic polarization controllers, reduce complexity of photoelectric devices and DSP on a receiving end, significantly decrease system latency, and thus reduce cost.

The foregoing description of the exemplary embodiments of the invention has been presented only for the purposes of illustration and description and is not intended to be exhaustive or to limit the invention to the precise forms disclosed. Many modifications and variations are possible in light of the above teaching.

While there has been shown several and alternate embodiments of the present invention, it is to be understood that certain changes can be made as would be known to one skilled in the art without departing from the underlying scope of the invention as is discussed and set forth above and below including claims and drawings. Furthermore, the embodiments described above are only intended to illustrate the principles of the present invention and are not intended to limit the scope of the invention to the disclosed elements.

What is claimed is:

1. An array-type polarization-maintaining multi-core fiber, comprising:
    a main outer cladding, fiber core units, and stress units,
    wherein the fiber core units and the stress units are arranged to form a unit array, the unit array including one central unit located in a center of the unit array and any unit in the unit array being equidistantly arranged from adjacent units thereof, wherein said one central unit is a central fiber core unit that is one of the fiber core units;
    wherein the stress units comprise at least one pair of stress units, each pair of stress units being arranged symmetrical about the central fiber core unit to form a central polarization-maintaining fiber core unit located in the center of the unit array, and wherein the stress units are symmetrically arranged on adjacent two sides of the central polarization-maintaining fiber core unit;
    wherein each of the fiber core units includes a fiber core and an inner cladding surrounding the fiber core;
    wherein the main outer cladding surrounds the fiber core units and the stress units; and
    wherein a relative refractive index difference between the inner cladding and the main outer cladding is −0.5%-0.05%.

2. The array-type polarization-maintaining multi-core fiber according to claim 1, wherein a distance between the adjacent units is 20-60 μm.

3. The array-type polarization-maintaining multi-core fiber according to claim 1, wherein the unit array includes seven units, and is a regular hexagonal single-layer unit array including the central fiber core unit located at the center and a pair of stress units symmetrical about the center, and the rest units being fiber core units.

4. The array-type polarization-maintaining multi-core fiber according to claim 1, wherein the array unit includes nineteen units, and is a regular hexagonal double-layer unit array including the central fiber core unit located at the center and a pair of stress units symmetrical about the center, and the rest units being fiber core units.

5. The array-type polarization-maintaining multi-core fiber according to claim 1, wherein each of the stress units has a cross-section of a round shape, a diameter of 5-45 μm, and a molar concentration of a doped element of 5%-30%, and wherein polarization crosstalk at an operating wavelength of the polarization-maintaining fiber core within 1000 m is not lager than −10 dB.

6. The array-type polarization-maintaining multi-core fiber according to claim 1, wherein the fiber core has a step refractive index and a diameter of 5-15 μm, and wherein a relative refractive index difference between the fiber core and the main outer cladding is 0.15%-0.45%.

7. The array-type polarization-maintaining multi-core fiber according to claim 1, wherein the fiber core has a graded refractive index which is represented as $n(r)=n_0\cdot[1-2\Delta(r/a)^m]^{0.5}$, $0 \le r \le a$, wherein a radius a of the fiber core is 2.5-25 μm; a relative refractive index difference $\Delta$ between a geometric center of the fiber core and the main outer cladding is 0.20%-1.50%; a characteristic parameter m is 1.5-2.5; r is a distance from any point on the fiber core to the geometric center; and $n_0$ is a refractive index at the geometric center of the fiber core.

8. The array-type polarization-maintaining multi-core fiber according to claim 1, wherein the inner cladding has a unilateral thickness of 1-10 μm; and the main outer cladding is a pure silica glass layer.

9. The array-type polarization-maintaining multi-core fiber according to claim 8, wherein the fiber core and the inner cladding are provided therebetween with a transitional inner cladding, wherein a ratio of a diameter of the transitional inner cladding to a diameter of the fiber core is 1.0-3.0, and the transitional inner cladding is a pure silica glass layer.

* * * * *